United States Patent [19]

Gravel

[11] 4,212,513
[45] Jul. 15, 1980

[54] PULSE TRANSFORMER TECHNIQUE FOR OPTICAL SWITCH

[75] Inventor: Robert L. Gravel, Stow, Mass.

[73] Assignee: Sperry Corporation, New York, N.Y.

[21] Appl. No.: 920,865

[22] Filed: Jun. 30, 1978

[51] Int. Cl.² ............................................... G02B 5/14
[52] U.S. Cl. ................... 350/96.15; 310/317;
350/96.14; 350/355; 350/360
[58] Field of Search ............... 350/96.13, 96.14, 96.15,
350/96.29, 355, 356, 360; 310/317, 329

[56] References Cited
U.S. PATENT DOCUMENTS

| | | | |
|---|---|---|---|
| 3,315,102 | 4/1967 | Quint et al. | 310/317 |
| 3,521,942 | 7/1970 | Temple | 350/356 |
| 3,904,274 | 9/1975 | Feinleib et al. | 350/360 |
| 3,980,905 | 9/1976 | Miller | 310/317 |
| 4,087,715 | 5/1978 | Myer | 310/317 |
| 4,139,259 | 2/1979 | Kersten et al. | 350/96.13 X |

OTHER PUBLICATIONS

Nelson et al., "Electro-Optic Multiplexer for Large-Numerical-Aperture, Low-Loss Fibers", *Optics Letters*, vol. 1, No. 1, Jul. 1977, pp. 35–37.
Schmidt et al., "Efficient Optical Waveguide Switch/Amplitude Modulator", *Optics Letters*, vol. 2, No. 2, Feb. 1978, pp. 45–47.

*Primary Examiner*—John K. Corbin
*Assistant Examiner*—John D. Lee
*Attorney, Agent, or Firm*—Howard P. Terry

[57] ABSTRACT

Optical communication apparatus is disclosed whereby the voltage controlled load device typically requiring a relatively high energizing voltage is operated by means of a wide band step-up pulse transformer and a low voltage power source. The step-up transformer permits operation of the fiber optic communication system from a power source as low as 5 volts D.C. to obtain the necessary modulation potential required by the electro-optic and piezoelectric load device.

3 Claims, 4 Drawing Figures

PULSE TRANSFORMER TECHNIQUE FOR OPTICAL SWITCH

BACKGROUND OF THE INVENTION

1. Field of the Invention

This invention pertains to fiber optic communication systems and, more particularly, to means for operating an electro-optic and piezoelectric voltage control light switch via a low D.C. potential.

2. Description of the Prior Art

Although methods of controlling optical communication systems are known in the art, the development of optical communication systems requires that simple and efficient methods of controlling the optical signals must be pursued if an optical communication system is to be considered for commercial use in the computer and communication fields. One approach to controlling the optical signals of such a communication system is through the implementation of electro-optic devices. An electro-optic device is an optical modulation device comprised of a thin parallel crystal plate structure that forms a voltage controlled light modulator or light switch. The electro-optic device responds to an energizing voltage to modulate or switch the optical signals. Another type of modulator or light switch is a piezoelectric device, either a crystal or a ceramic, which responds to an excitation voltage applied thereto by contracting or expanding. Thus, the piezoelectric type of switch could be connected to an optical communication system to physically position and/or disconnect an optical fiber to another fiber. However, both of these devices require a relatively high modulation or excitation voltage for operation. As low voltage supplies are standard in the computer and communication fields, the relatively high modulation or excitation voltages, at least an order of magnitude greater than those found in the typical computer, optical systems having electro-optic or piezoelectric devices therein have not been readily adopted nor considered to be economically feasible in these areas.

Accordingly, there is a need to provide an optical communication system operable from the low voltage power sources typically available in the computer and communication fields.

SUMMARY OF THE INVENTION

In accordance with the invention, optical communication apparatus is disclosed having a voltage controlled light switch operable from a low voltage power source.

Specifically, the apparatus of this invention is directed to an optical communication system responsive to a voltage controlled light modulator or light switch interconnected by means of a step-up transformer to a drive signal. The transformer has its primary coil coupled to the pulsed drive signal and a low voltage power source and the secondary coil coupled across the light switch, wherein the required relatively high pulsed, switching potential of the light switch is applied to the switch and across the load device via the low voltage power source and the transformer.

More specifically, the step-up pulse transformer comprises a d.c. isolated primary and secondary coiled about an all ferrite core. A low voltage signal, such as that produced by a TTL voltage level, energizes the transformer primary and is also coupled to the pulse driver stage whose pulse signal modulates the light switch.

DESCRIPTION OF THE PREFERRED EMBODIMENT

For a more complete appreciation of the invention, attention is invited to the following description of the illustrative embodiments of the invention as shown in the attached drawings.

Figure 1:
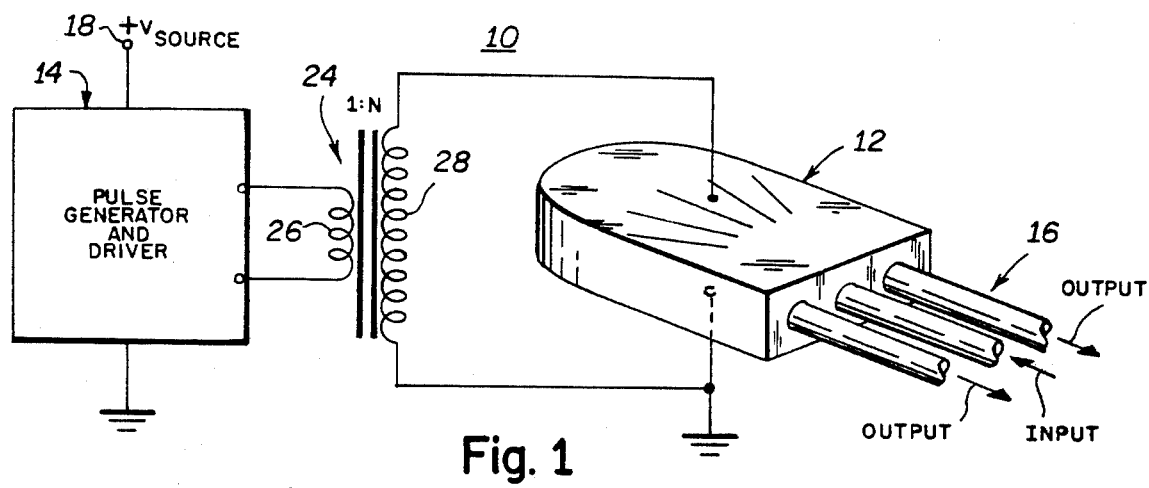
FIG. 1 schematically illustrates the preferred embodiment of the invention.

Referring to FIG. 1, in which is shown the preferred embodiment of the optical communication apparatus 10 of this invention, a voltage controlled light switch or light modulator 12, which may be considered the circuit load, is coupled to a pulse generator and driver circuit 14 to modulate or act as a light switch for an optical circuit, a portion 16 of which is schematically shown. The pulse generator and driver circuit 14 includes a terminal 18 for connection to a voltage source not shown, and a terminal 20 (FIG. 2) coupled to receive a drive signal, schematicaly illustrated at 22, for modulation or for switching of the optical circuit 16 by means of the light switch 12. As previously indicated, the light switch 12 may be an electro-optic or a piezoelectric device in the form of a crystal or a ceramic material.

In accordance with this invention, the light switch 12 coupled to the optical circuit 16 is coupled to the pulse generator and driver circuit 14 via a step-up pulse transformer 24 having its primary coil 26 coupled to the pulse generator and driver circuit 14 and its secondary coil 28 coupled across the light switch 12. The step-up pulse transformer has a turns ratio, primary to secondary, of 1:N wound about a high permeability ferrite core such that the pulse generator 14 driven from a relatively low voltage source 18, for example, on the order of 5 volts D.C., or a 5 volt TTL source, provides sufficiently high energizing voltage pulses to the optical switch 12. For example, step-up pulse transformers 24 were fabricated having turns ratios of 1:10 to 1:40 providing an output voltage across the secondary 28 of approximately 40 to 170 volts for a 5 volt source. And, more specifically, for a transformer having a primary to secondary turns ratio of 1:30, a 120 volt peak modulation pulse was applied across the light switch 12, an electro-optic device, from a 1 volt drive signal pulse, resulting in 50% of optical modulation.

Figure 2:
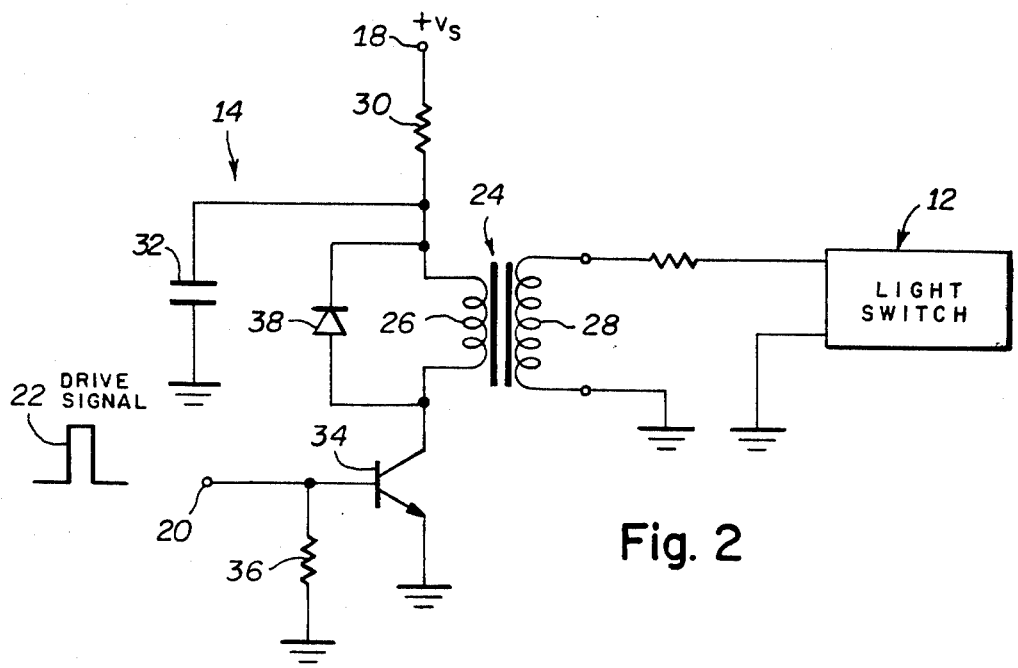
FIG. 2 illustrates the pulse generator and driver circuit of FIG. 1.

Referring to FIG. 2, the pulse generator and driver circuit 14 is illustrated in a common configuration. As shown, the pulse generator and driver circuit 14 comprises a resistor 30 having one terminal coupled to the voltage source terminal 18. The other terminal of the resistor 30 is coupled to a capacitor 32 coupled to ground, and a terminal of the primary 26. The other terminal of the primary 26 is coupled to collector of a transistor 34, having its emitter coupled to ground and its base coupled to the pulse drive signal terminal 20 and a terminal of grounded resistor 36. In addition, a diode 38 is coupled across the primary 26 terminal as indicated in the figure. Thus, the drive signal or pulse 22 is coupled via terminal 20 to the primary 26 of the transformer 24 energized by the D.C. voltage source at terminal 18, and the drive signal pulse 22 is coupled via the transformer 24 to the light switch 12 as a modulation pulse of substantially increased peak value sufficient to operate the light switch.

Figure 3:
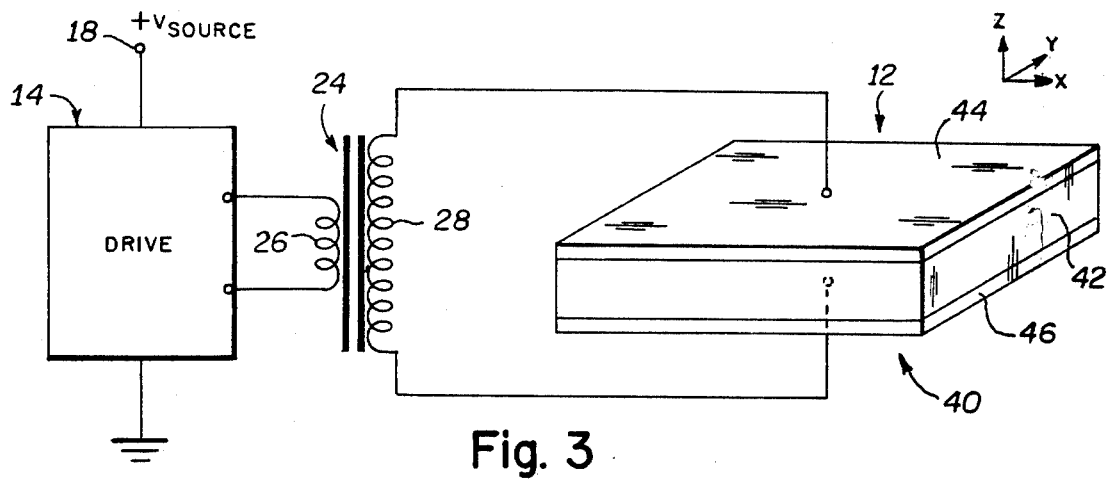
FIGS. 3 and 4 illustrate the preferred embodiment of the invention coupled to a piezoelectric device.
Figure 4:
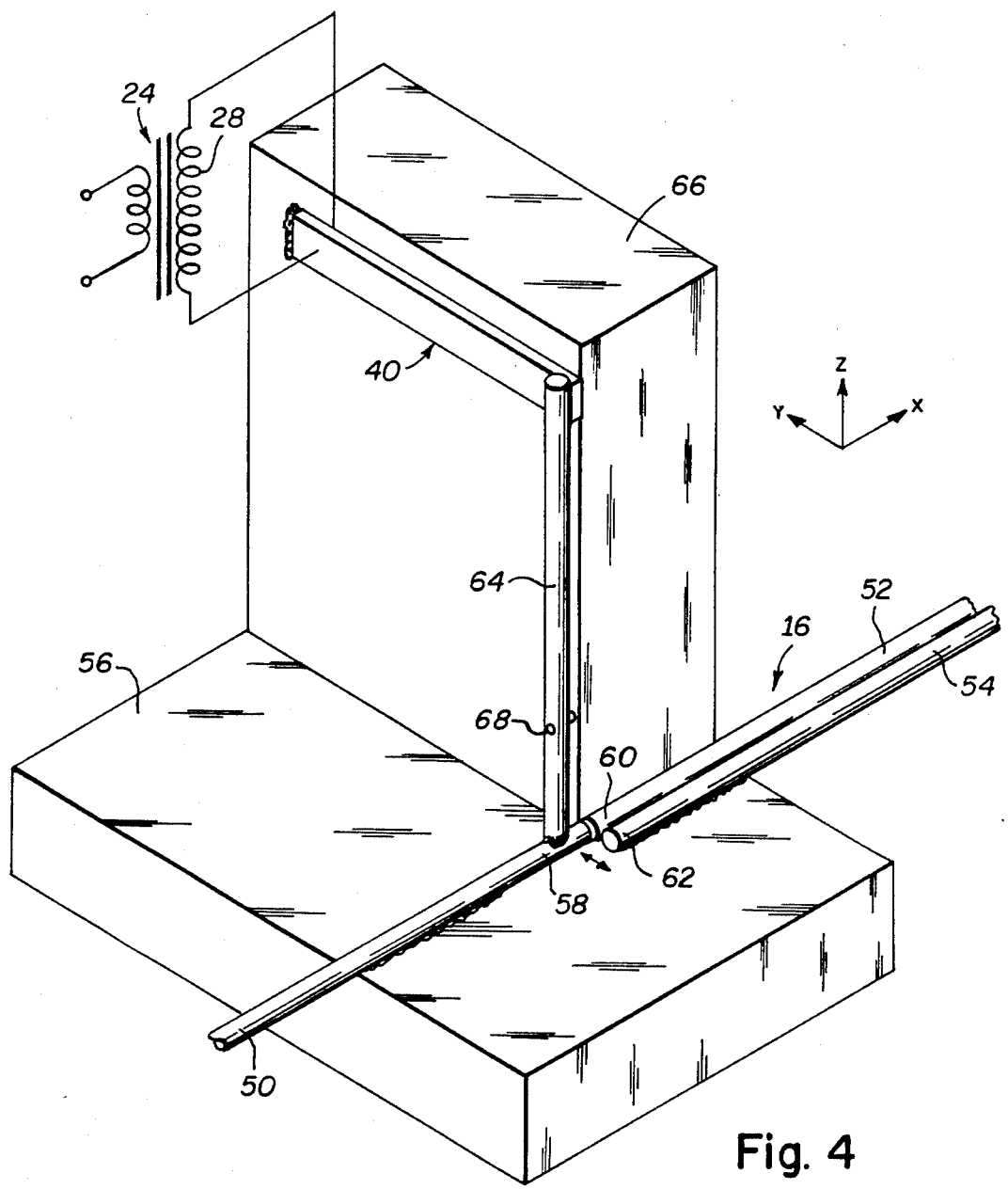

Referring to FIG. 3, the optical communication apparatus 10 includes a light switch 12 comprising a piezoelectric device 40 coupled across the secondary 28 of the transformer 24. The piezoelectric device 40 comprises a thin rectangular slab of piezoelectric material, PLZT (lead-lathanum-titanate-zirconate) 42, having top and bottom conducting electrode surfaces 44, 46, respectively, attached thereto. The piezoelectric device 40 or light switch 12 operates, that is, contracts or expands along its major axis, in this example, along the X axis, in response to a voltage pulse of relatively high magnitude, i.e., on the order of 700 volts. For example, a PLZT material device having the dimensions, as measured along the XYZ coordinate system shown in the figure, of $X=1$ centimeter, $Y=2$ millimeters and $Z=0.25$ millimeter, will contract or expand approximately 0.43 micrometers in response to a 700 volt pulse. The contraction or expansion of the device 12 in response to the voltage pulse may be used to modulate or switch an optical signal in the coupled optical circuit 16 when a suitable optical fiber is attached thereon. For example, FIG. 4 illustrates the optical circuit 16 having an optical fiber input 50 and two optical fiber outputs 52, 54, respectively. The optical fibers are mounted, i.e., bonded to a mounting block 56, wherein the output end 58 of the input fiber 50 is free to translate in the Y direction, as illustrated, whereas the input ends 60, 62 of the output fibers 52,54, respectively, are secured to the block 56. The input fiber 50 or, more specifically, the output end 58 thereof, is coupled to one end of a cantilever rod 64 having its other end coupled to the piezoelectric device 40. The piezoelectric device is mounted at one end to a mounting block 66 and is coupled to the secondary 28 of the transformer 24. As the piezoelectric device expands or contracts in response to a sufficiently high signal, the mechanical advantage of the rod 64 pivoted at 68 switches the input fiber 50 from one fiber 52,54 to the other output fiber 54, 52, respectively.

The apparatus 10 of this invention and, more specifically, the transformer 24 comprises a configuration having a D.C. isolated primary and secondary coil, wherein the primary coil is coupled to the drive circuit to achieve a particular output pulse characteristic. In the preferred embodiment of the invention, the ferrite cores of the transformer 24 were maufactured by Ferroxcube Corporation, Saugerties, New York, having a standard ferrite material and core type and, specifically, the ferroxcube 3E2A MnZn ferrite material, having a high initial permeability, was utilized.

In accordance with the apparatus of this invention, modulation or switching of optical signals is provided by means of a low voltage d.c. source and a step-up pulse transformer which provides the relatively high potential required by the light switches.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A switch for use in an optical circuit responsive to a relatively low voltage power source, the circuit having an input portion and at least two output portions cooperating with said switch, comprising:
   a piezoelectric device responsive to a relatively high voltage, a cantilever rod mounted for pivotal movement having one end coupled to said piezoelectric device and the other end coupled to an end of the input portion of the optical circuit and wherein said rod switches the input to one of the outputs in response to said piezoelectric device,
   a step-up transformer having its secondary windings coupled across said piezoelectric device for providing the relatively high voltage to the piezoelectric device, and
   a drive circuit, including a terminal for connection to a relatively low voltage power source, responsive to a drive signal pulse of relatively low voltage, said drive circuit being coupled to the primary windings of said step-up transformer, whereby in response to the relatively low voltage drive signal said drive circuit energizes said step-up transformer such that said piezoelectric device is actuated by the required relatively high voltage, in response thereto, and couples the input portion from one of said output portions to another of the said output portions.

2. A switch according to claim 1 wherein the step-up transformer includes an all ferrite core.

3. A switch according to claim 2 wherein the step-up transformer has a turns ratio of 1:10 to 1:40.

* * * * *